(12) United States Patent
Yamasaki

(10) Patent No.: US 11,092,817 B2
(45) Date of Patent: Aug. 17, 2021

(54) IMAGE PICKUP APPARATUS

(71) Applicant: CANON KABUSHIKI KAISHA, Tokyo (JP)

(72) Inventor: Shinji Yamasaki, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 162 days.

(21) Appl. No.: 16/149,699

(22) Filed: Oct. 2, 2018

(65) Prior Publication Data

US 2019/0107731 A1 Apr. 11, 2019

(30) Foreign Application Priority Data

Oct. 6, 2017 (JP) .............................. JP2017-195995

(51) Int. Cl.
*G02B 27/64* (2006.01)
*G02B 7/04* (2021.01)
(Continued)

(52) U.S. Cl.
CPC ............. *G02B 27/646* (2013.01); *G02B 7/04* (2013.01); *G02B 15/1425* (2019.08);
(Continued)

(58) Field of Classification Search
CPC ...... G02B 27/646; G02B 15/173; G02B 7/04; G02B 15/16; G02B 27/642; G02B 27/644;
(Continued)

(56) References Cited

U.S. PATENT DOCUMENTS 4,733,264 A * 3/1988 Hatase ..................... G02B 7/36
348/208.99
9,148,575 B2 9/2015 Yamasaki
(Continued)

FOREIGN PATENT DOCUMENTS

CN 101035205 A 9/2007
CN 101132485 A 2/2008
(Continued)

OTHER PUBLICATIONS

Chinese Office Action dated Jan. 6, 2021, for Corresponding Chinese Application No. 201811146494.9.
(Continued)

*Primary Examiner* — Marin Pichler
*Assistant Examiner* — Henry A Duong
(74) *Attorney, Agent, or Firm* — Carter, DeLuca & Farrell LLP

(57) ABSTRACT

Provided is the image pickup apparatus including an optical system forming an image of an object, an image pickup element receiving light from optical system, a driving unit driving at least one of an optical element included in optical system and image pickup element in a direction including a component of a direction perpendicular to an optical axis of optical system, and a determining unit performing first determination that driving unit is set to be in a non-driving state (NDS) or performing second determination that driving unit is set to be in a driving state (DS) based on information regarding object. When first determination is performed, determining unit outputs a signal for maintaining driving unit in NDS or switching driving unit from DS to NDS. When second determination is performed, determining unit outputs a signal for maintaining driving unit in DS or switching driving unit from NDS to DS.

12 Claims, 17 Drawing Sheets

(51) Int. Cl.
　　　*G02B 15/16*　　　(2006.01)
　　　*G03B 17/18*　　　(2021.01)
　　　*G03B 5/00*　　　(2021.01)
　　　*G02B 15/173*　　　(2006.01)
　　　*G02B 15/14*　　　(2006.01)

(52) U.S. Cl.
　　　CPC ..... *G02B 15/145129* (2019.08); *G02B 15/16* (2013.01); *G02B 15/173* (2013.01); *G03B 5/00* (2013.01); *G03B 17/18* (2013.01); *G03B 2205/0007* (2013.01); *G03B 2205/0015* (2013.01)

(58) Field of Classification Search
　　　CPC .. G03B 17/18; G03B 5/00; G03B 2205/0015; G03B 2205/0007; H02K 41/0356; H04N 5/23258; H04N 5/2328
　　　USPC ........................................................ 359/557
　　　See application file for complete search history.

(56) References Cited

U.S. PATENT DOCUMENTS

| | | | |
|---|---|---|---|
| 9,350,919 B2 | 5/2016 | Yamasaki | |
| 9,575,296 B2 | 2/2017 | Kimura et al. | |
| 10,120,171 B2 | 11/2018 | Yamasaki | |
| 2005/0140793 A1* | 6/2005 | Kojima | H04N 5/23287 348/208.99 |
| 2012/0113280 A1 | 5/2012 | Stupak et al. | |
| 2018/0100994 A1 | 4/2018 | Sudo et al. | |
| 2018/0157014 A1 | 6/2018 | Yamasaki | |
| 2020/0026047 A1* | 1/2020 | Hosoi | G02B 13/02 |

FOREIGN PATENT DOCUMENTS

| | | |
|---|---|---|
| CN | 101897174 A | 11/2010 |
| CN | 105388607 A | 3/2016 |
| CN | 105519103 A | 4/2016 |
| JP | 2007243759 A | 9/2007 |
| JP | 2009153085 A | 7/2009 |
| JP | 2012165427 A | 8/2012 |
| JP | 2013134385 A | 7/2013 |
| JP | 2014209226 A | 11/2014 |
| JP | 2016201596 A | 12/2016 |

OTHER PUBLICATIONS

Notice of Reasons for Refusal issued by the Japan Patent Office dated Jun. 29, 2021 in corresponding JP Patent Application No. 2017-195995, with translation.

\* cited by examiner

FIG. 5
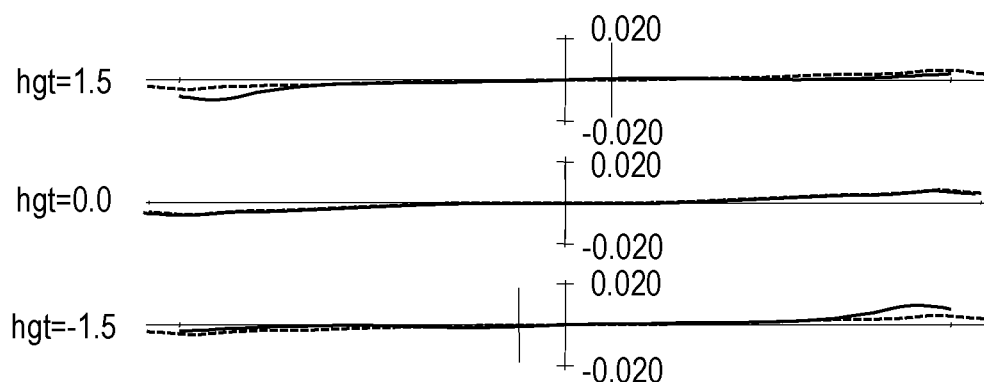
WITHOUT IMAGE STABILIZATION
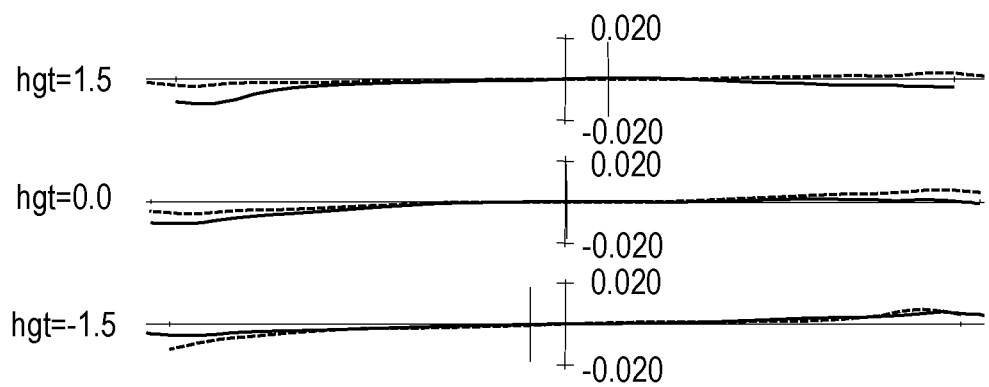
WITH IMAGE STABILIZATION

FIG. 6A
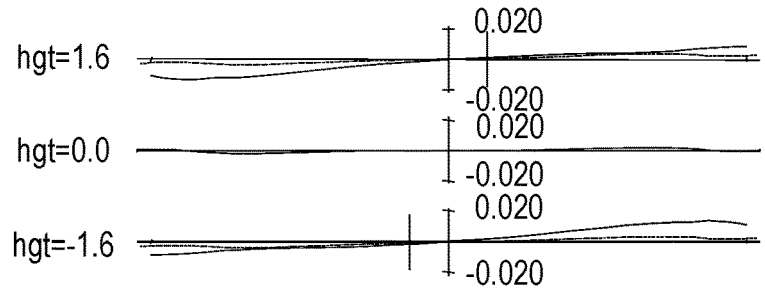
WITHOUT IMAGE STABILIZATION
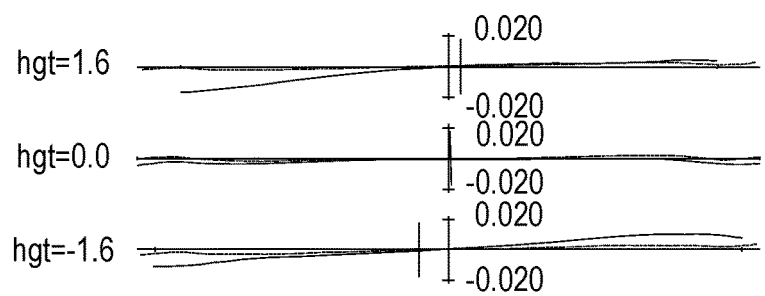
WITH IMAGE STABILIZATION
FIG. 6B
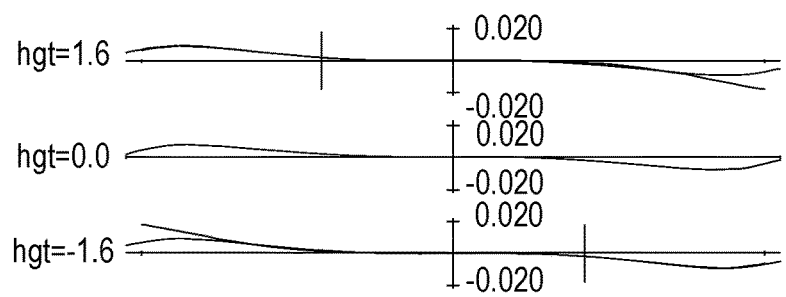
WITHOUT IMAGE STABILIZATION
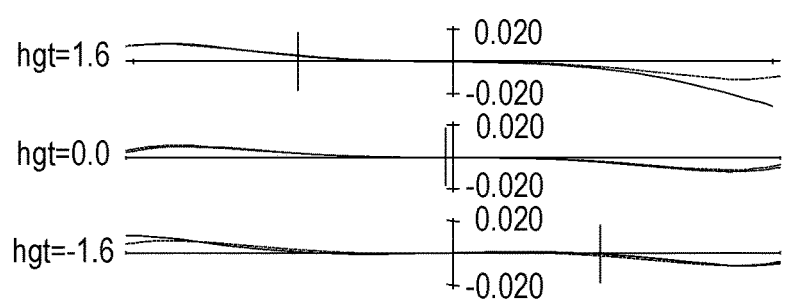
WITH IMAGE STABILIZATION

WIDE ANGLE END

TELEPHOTO END

«IMAGE PICKUP APPARATUS

BACKGROUND OF THE INVENTION

Field of the Invention

The present invention relates to an image pickup apparatus with a function of image stabilization, which is favorable for a monitoring camera and the like, for example.

Description of the Related Art

A lens with a high optical performance suitable for high-definition of an image pickup element has been desired as an imaging optical system used in an image pickup apparatus. In particular, there has been a demand for avoiding blurring of an image of an object due to vibration during imaging by the image pickup apparatus. Japanese Patent Application Laid-open Nos. 2014-209226 and 2013-134385 disclose cameras each provided with an image stabilization mechanism for suppressing blurring of images of objects.

In the case of an image pickup apparatus used outdoors or inside a vehicle, such as a monitoring camera (vehicle-mounted camera), the image quality of an obtained image is especially easily affected by vibration. However, since the image pickup apparatus disclosed in Japanese Patent Application Laid-open No. 2014-209226 or 2013-134385 is a general camera that operates for a limited time after activation, the image stabilization mechanism is continuously driven once the camera is activated. When this camera is applied to an image pickup apparatus such as the monitoring camera that continuously performs imaging after activation, the image pickup apparatus has a problem of durability because the long-time driving of the image stabilization mechanism causes the image pickup apparatus to have a failure and consume a considerable amount of battery.

SUMMARY OF THE INVENTION

An object of the present invention is to provide an image pickup apparatus with excellent durability that is provided with a function of correcting blurring of an image of an object.

The image pickup apparatus according to the present invention includes an optical system that forms an image of an object, an image pickup element that receives light from the optical system, a driving unit that drives at least one of an optical element included in the optical system and the image pickup element in a direction including a component of a direction perpendicular to an optical axis of the optical system, and a determining unit that performs first determination that the driving unit is set to be in a non-driving state or performs second determination that the driving unit is set to be in a driving state based on information regarding the object. When the first determination is performed, the determining unit outputs a signal for maintaining the driving unit in the non-driving state or switching the driving unit from the driving state to the non-driving state. When the second determination is performed, the determining unit outputs a signal for maintaining the driving unit in the driving state or switching the driving unit from the non-driving state to the driving state.

Further features of the present invention will become apparent from the following description of exemplary embodiments with reference to the attached drawings.

BRIEF DESCRIPTION OF THE DRAWINGS

FIG. 5 is lateral aberration diagrams of the optical system of any one of the first to third embodiments at the wide angle end.

FIG. 6A is lateral aberration diagrams of the optical system of any one of the first to third embodiments at the intermediate zoom position.

FIG. 6B is lateral aberration diagrams of the optical system of any one of the first to third embodiments at the telephoto end.

DESCRIPTION OF THE EMBODIMENTS

Preferred embodiments of the present invention will now be described in detail in accordance with the accompanying drawings.

An image pickup apparatus according to embodiments of the present invention is described below with reference to the accompanying drawings.

(Image Pickup Apparatus)

Figure 1:
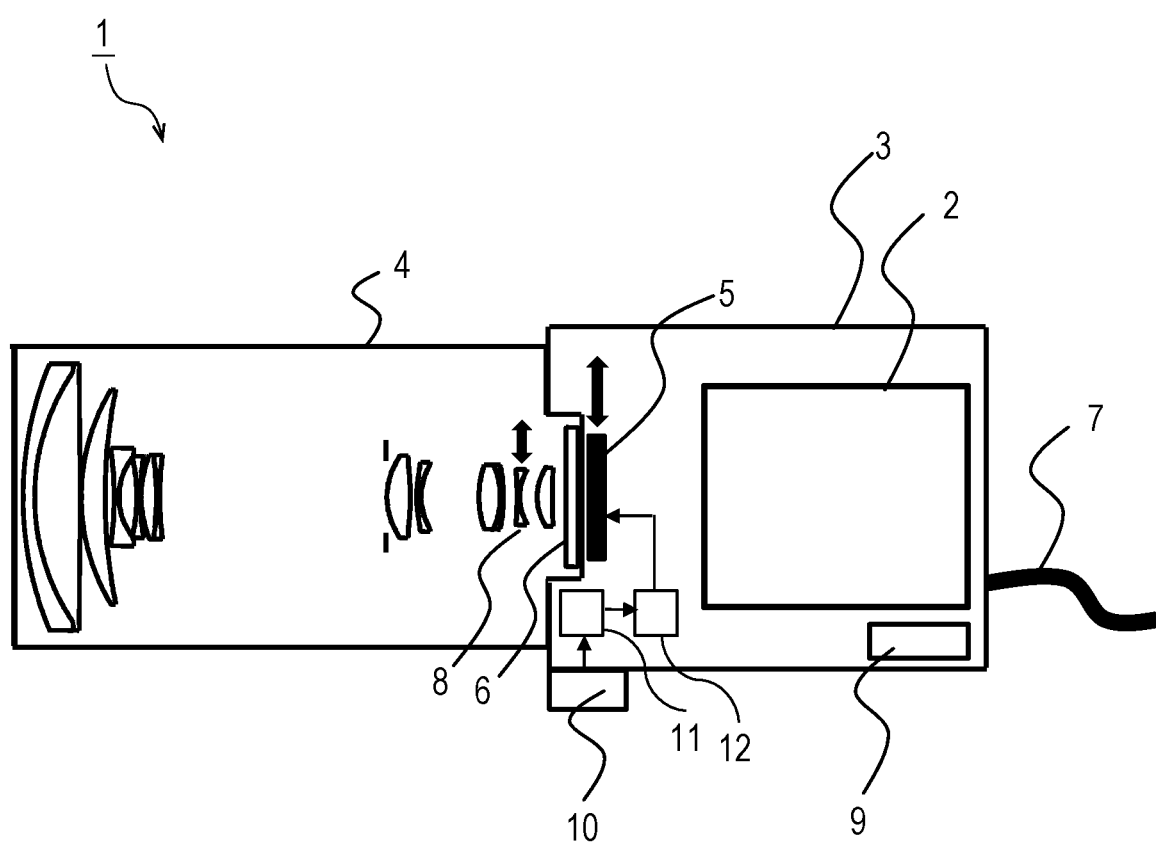
FIG. 1 is a schematic diagram of a main part of an image pickup apparatus of any one of first to third embodiments of the present invention.

As illustrated in FIG. 1, an image pickup apparatus according to embodiments of the present invention applicable for a monitoring camera includes an imaging optical system 4 as an optical system that forms an image of an object (for the sake of convenience, a lens barrel is also denoted by the same reference numeral) and an image pickup element 5 that receives light from the optical system 4. In addition, for correcting image-blurring, the image pickup apparatus includes a driving unit 12 that drives at least one (image-blurring correcting element) of an optical element included in the imaging optical system 4 and the image pickup element 5 in a direction including a component of a direction perpendicular to an optical axis of the imaging optical system 4. Moreover, the image pickup apparatus includes a control unit (CPU) as a determining unit 11 that performs first determination that the driving unit 12 is set to be in a non-driving state or performs second determination that the driving unit 12 is set to be in a driving state based on information regarding the object.

Here, the driving unit is a driving element such as an actuator that drives the image-blurring correcting element in the direction including the component of the direction perpendicular to the optical axis of the imaging optical system, and this driving unit and the image-blurring correcting element are collectively called an image-blurring correcting unit (correcting unit).

The information regarding the object includes information such as a shape of the object (person, animal, another object, background, etc.), a light amount of the object (light amount of imaging environment), existence or non-existence of a moving object (person, vehicle, etc.) in the imaging environment, and the like. The object indicates anything (person, animal, object, background, etc.) that is imaged by the image pickup element.

The non-driving state of the driving unit indicates a state where the driving unit is not electrically energized and unable to drive the image-blurring correcting element. That is, the non-driving state is fundamentally different from a state where the driving unit is electrically energized and waiting for signal input for driving the image-blurring correcting element. The latter is fundamentally different from the former since the image-blurring correcting element does not remain still in a reference position but reciprocates (vibrating) around the reference position.

The driving state of the driving unit indicates a state where the driving unit is electrically energized and able to drive the image-blurring correcting element.

In FIG. 1, the reference numeral 1 denotes the monitoring camera, the reference numeral 2 denotes a signal processing unit, the reference numeral 3 denotes a main body (apparatus main body) of the image pickup apparatus, and the reference numeral 4 denotes the imaging optical system and also including the lens barrel for the sake of convenience. In this embodiment, a solid-state image pickup element provided with an image stabilization mechanism that receives light of the object image is illustrated as the image pickup element 5. The reference numeral 6 denotes an insertable and removable IR cut filter, the reference numeral 7 denotes a network cable for transferring the object image, and the reference numeral 8 denotes an image stabilization lens unit as the image-blurring correcting element. The reference numeral 9 denotes a memory unit (storing unit) for recording information corresponding to the object image photoelectrically converted by the solid-state image pickup element.

As described later, a sensor 10 has a function of detecting any one of a light amount (light amount around the main body of the apparatus), vibration (vibration of the main body of the apparatus), and a focal length of the imaging optical system, or of detecting whether the object is a monitoring target (predetermined object), for example. This sensor 10 is a detecting unit that outputs a predetermined detection signal used for the determination by the determining unit 11. For example, when detecting the light amount or the existence or non-existence of a person as the object, the image pickup element 5 may also be used as the sensor 10.

Once the detection signal of the sensor 10 is inputted to the determining unit 11, the determining unit 11 determines whether to set the driving unit 12 into the non-driving state or the driving state, and when determining to set the driving unit 12 into the driving state, the determining unit 11 outputs an output signal for driving the driving unit 12.

In FIG. 1, the lens barrel 4 can be detached from the image pickup apparatus main body 3 for replacement. This makes it possible to easily replace the lens barrel with the one with different focal length depending on a purpose of monitoring.

As the correcting unit, it is possible to drive the image stabilization lens unit 8 in the lens barrel in the direction including the component of the direction perpendicular to the optical axis; however, it is also possible to drive the image pickup element 5 in the image pickup apparatus main body in the direction including the component of the direction perpendicular to the optical axis. In addition, it is also possible to drive not only either one of the image stabilization lens unit and the image pickup element but both of them in the direction orthogonal to the optical axis.

When a part of the lenses is driven in the direction orthogonal to the optical axis as either the image stabilization lens unit or an image stabilization lens, it is desirable for the image stabilization lens unit or the image stabilization lens to have a light weight as much as possible.

The sensor 10 is not limited to be arranged outside or inside the main body 3 and may be arranged outside or inside the lens barrel 4.

(Imaging Optical System)

Figure 2:
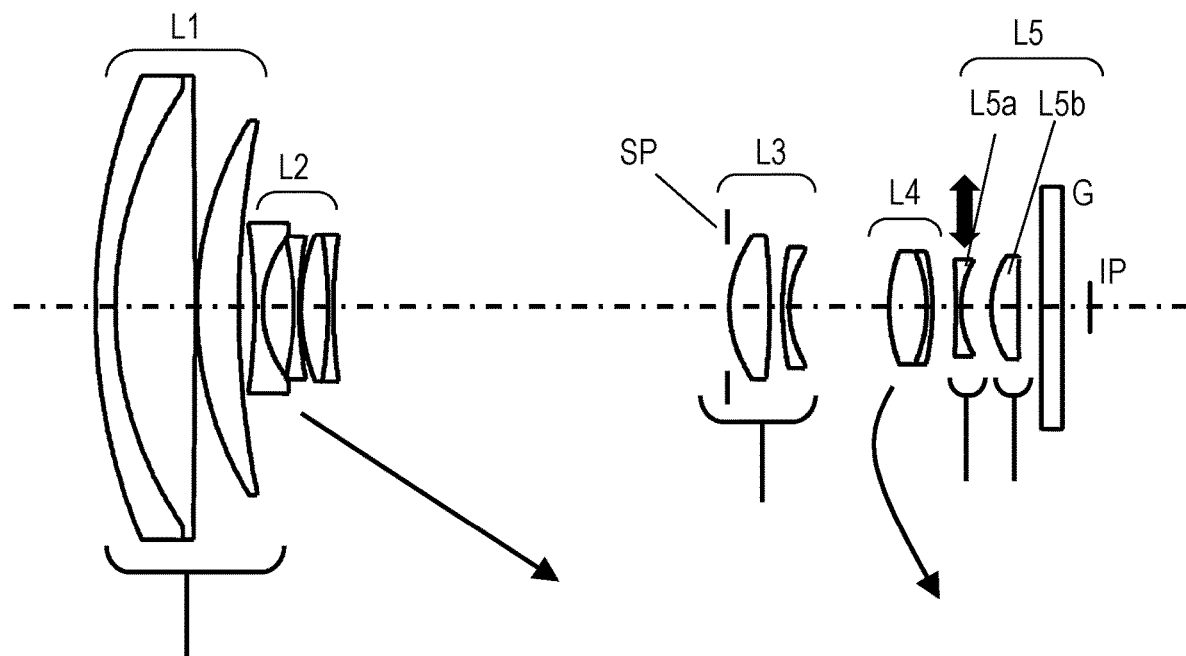
FIG. 2 is a cross-sectional view of an optical system of any one of the first to third embodiments at a wide angle end.

As illustrated in FIG. 2, the imaging optical system according to the embodiments of the present invention forms the image of the object on a light-receiving surface of the image pickup element. The imaging optical system illustrated in FIG. 2 is a zoom lens including five lens units that are, in the order from the object side, a first lens unit L1 with a positive refractive power, a second lens unit L2 with a negative refractive power, a third lens unit L3 with a positive refractive power, a fourth lens unit L4 with a positive refractive power, and a fifth lens unit L5 with a positive refractive power.

The fifth lens unit L5 provided with at least one lens in this embodiment is divided into a front unit L5a with a negative power and a back unit L5b with a positive power, and the image stabilization is achieved by moving the front unit L5a with a negative power in the direction orthogonal to the optical axis of the imaging optical system 4. The zoom lens or the configuration of the units as the imaging optical system 4 are not limited herein.

In FIG. 2, during zooming, the two second and fourth lens units L2 and L4 respectively move in directions of arrows (the lens unit L5 does not move for zooming). SP denotes an aperture stop located at the object side of the third, fourth, and fifth lens units L3, L4, and L5. G denotes an optical block corresponding to an optical filter, face plate, and so on. IP denotes an image plane corresponding to an imaging plane of the solid-state image pickup element (photoelectric conversion element) such as a CCD sensor, CMOS sensor, and so on.

Figure 3:
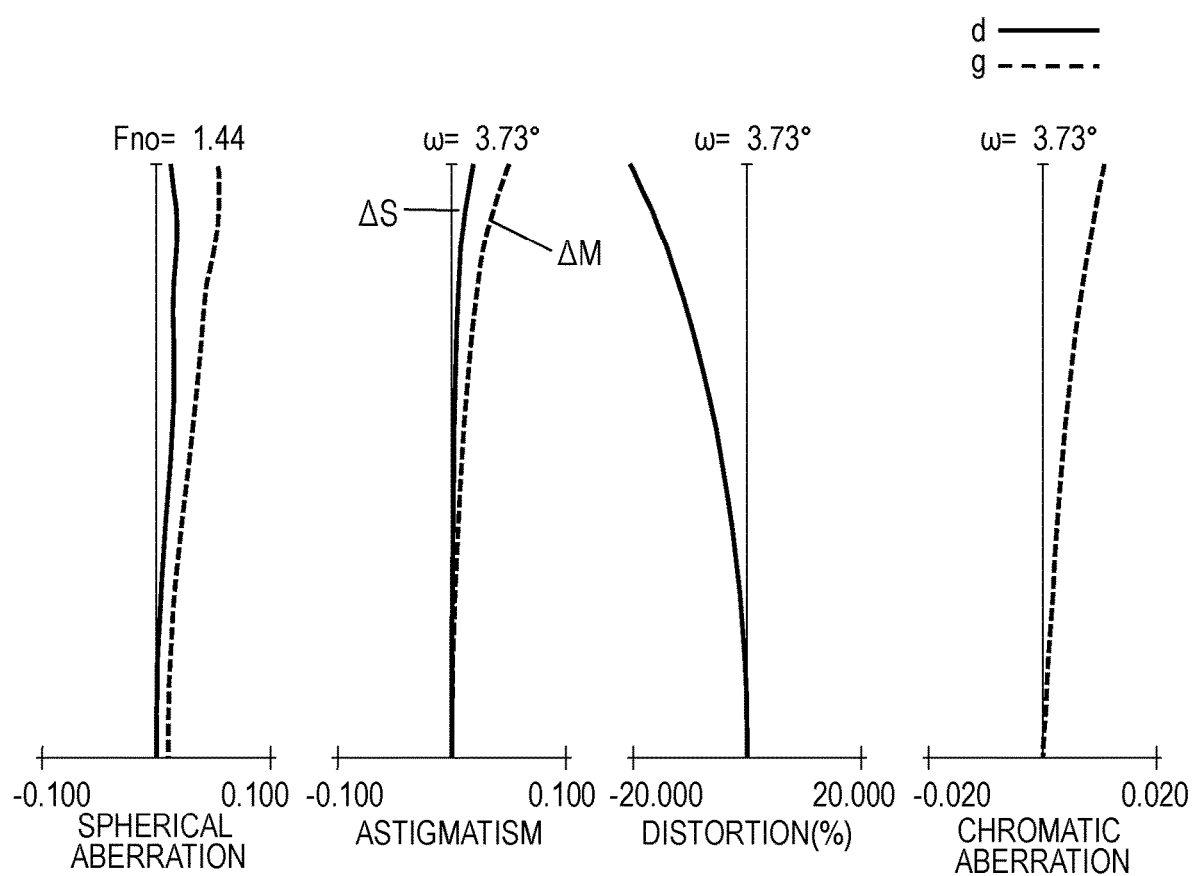
FIG. 3 is aberration diagrams of the optical system of any one of the first to third embodiments at the wide angle end.
Figure 4A:
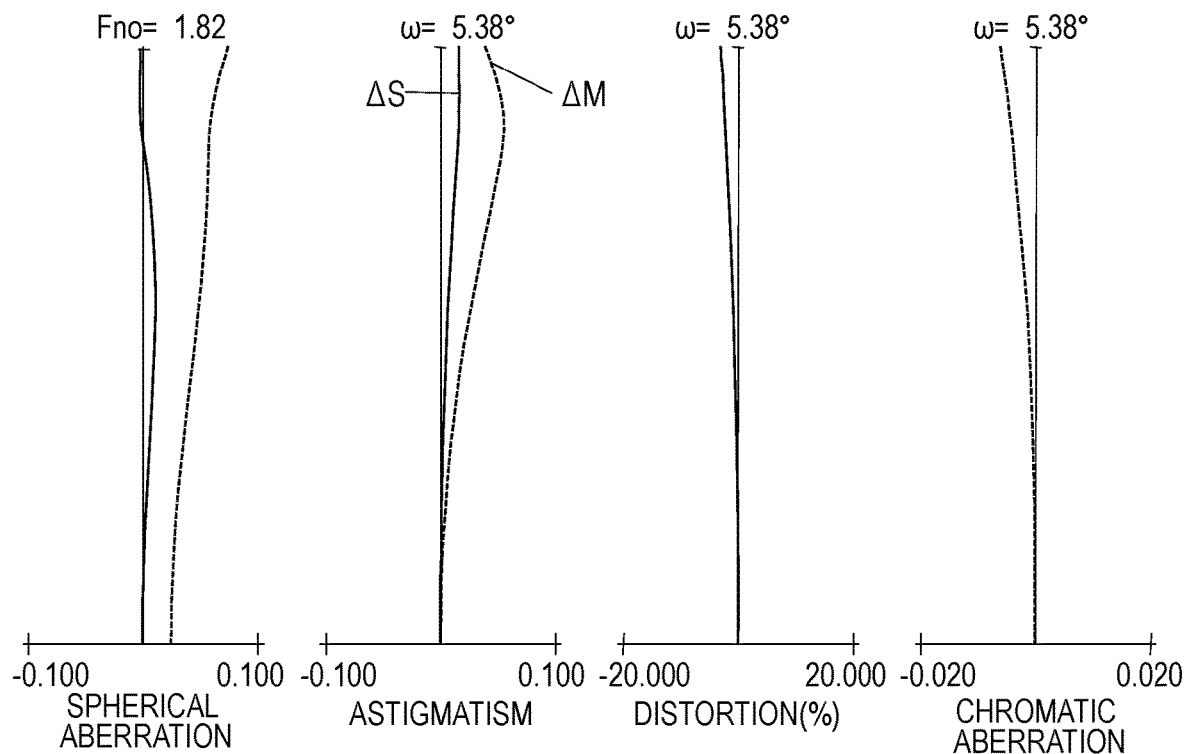
FIG. 4A is aberration diagrams of the optical system of any one of the first to third embodiments at an intermediate zoom position.
Figure 4B:
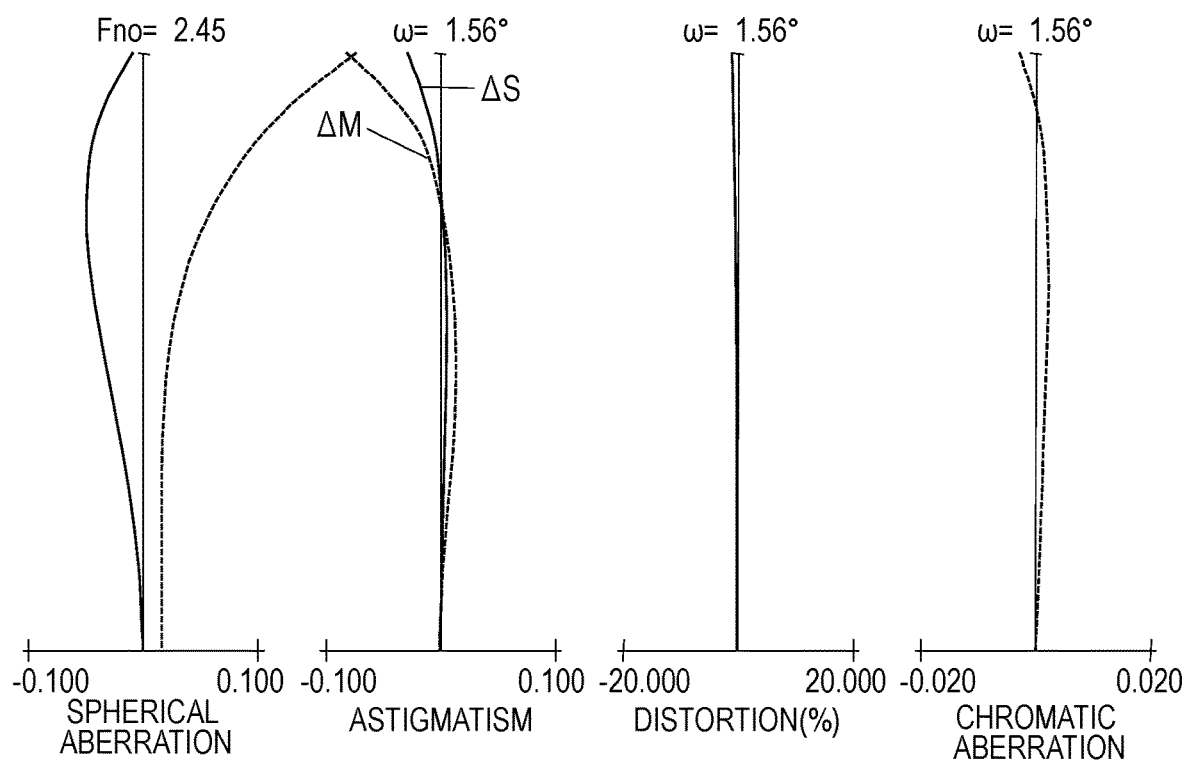
FIG. 4B is aberration diagrams of the optical system of any one of the first to third embodiments at a telephoto end.

In longitudinal aberration diagrams illustrated in FIGS. 3, 4A, and 4B, d and g respectively represent d-line and g-line, $\Delta M$ and $\Delta S$ respectively represent a meridional image plane and a sagittal image plane. The diagrams of astigmatism illustrate $\Delta M$ and $\Delta S$ of the d-line, the diagrams of distortion aberration illustrate distortion of the d-line, and the diagrams of lateral chromatic aberration illustrate aberration of the g-line with respect to the d-line. FIG. 3 is aberration diagrams of the imaging optical system of the embodiments of the present invention at a wide angle end, FIG. 4A is aberration diagrams of the imaging optical system of the embodiments of the present invention at an intermediate zoom position, and FIG. 4B is aberration diagrams of the imaging optical system of the embodiments of the present invention at a telephoto end.

In lateral aberration diagrams illustrated in FIGS. 5, 6A, and 6B, hgt represents an image height (mm), a solid line represents the meridional image plane of the d-line, and a dotted line represents sagittal image plane of the d-line. FIG. 5 includes lateral aberration diagrams of the imaging optical system according to the embodiments of the present invention at the wide angle end without image stabilization and with image stabilization (moving amount of image stabilization lens unit: 0.12 mm). FIG. 6A includes lateral aberration diagrams of the imaging optical system of the embodiments of the present invention at the intermediate zoom position without image stabilization and with image stabilization (moving amount of image stabilization lens unit: 0.12 mm), and FIG. 6B includes lateral aberration diagrams of the imaging optical system of the embodiments of the present invention at the telephoto end without image stabilization and with image stabilization (moving amount of image stabilization lens unit: 0.12 mm).

It is preferred for the image stabilization lens unit to be selected from the lens units at the image side from the aperture stop, which have smaller diameters, in order to reduce loads of driving as much as possible. In addition, it is preferred for the image stabilization lens unit to include a small number of lenses, like one negative lens herein. Moreover, it is preferred for using material with a small specific gravity, such as material that satisfies the conditional expression below;

$$1.0<DA<3.0 \quad (1).$$

Here, DA is the specific gravity of the material forming the image stabilization lens unit.

If the value exceeds the upper limit value in the conditional expression (1), the specific gravity becomes large, and accordingly a weight of the lens for image stabilization is increased. This increases the loads, and thus it is not preferable in terms of the durability of image pickup apparatus with image stabilization. On the other hand, if the value falls below the lower limit value in the conditional expression (1), the specific gravity becomes less than 1, and it is difficult to find optical material that satisfies such specific gravity.

It is further preferable for the conditional expression (1) to satisfy the numerical range below;

$$1.0<DA<2.0 \quad (1a).$$

It is much more preferable for the conditional expression (1) to satisfy the numerical range below;

$$1.0<DA<1.5 \quad (1b).$$

In the embodiments of the present invention, plastic material that satisfies the above conditional expressions is used for the front unit L5a, which is the image stabilization lens unit, of the fifth lens unit L5. In this embodiment, EP-4000 (manufactured by Mitsubishi Gas Chemical Company, Inc.) is used.

In addition, when a focal length of the lens unit next to the image stabilization lens unit at the object side is represented by ISf, a focal length of the lens unit next to the image stabilization lens unit at the image side is represented by ISr, and a focal length of the image stabilization lens unit is represented by ISg, it is desirable to satisfy the conditional expressions below;

$$-2.5<ISf/ISg<-0.4 \quad (A), \text{ and}$$

$$-2.5<ISr/ISg<-0.4 \quad (B).$$

This defines powers of the image stabilization lens unit and the front and rear lens units next to the image stabilization lens unit, and it is preferred that the signs of the powers of the front and rear lens units next to the image stabilization lens unit be different from the sign of the power of the image stabilization lens unit. This cancels out the aberration due to the refractive powers.

Moreover, when the ratio exceeds the upper limit value or falls below the lower limit value in the conditional expression (A) or (B), the balance for the power canceling will be lost undesirably.

(Determination on Driving of Driving Unit by Determining Unit)

In the embodiments of the present invention, the determining unit 11 that automatically determines to set the driving unit 12 into whether the non-driving state or the driving state based on the detection signal of the sensor 10 is provided. The embodiments are described below in relation to the determination on driving of the driving unit by the determining unit.

First Embodiment and Modification

Figure 7:
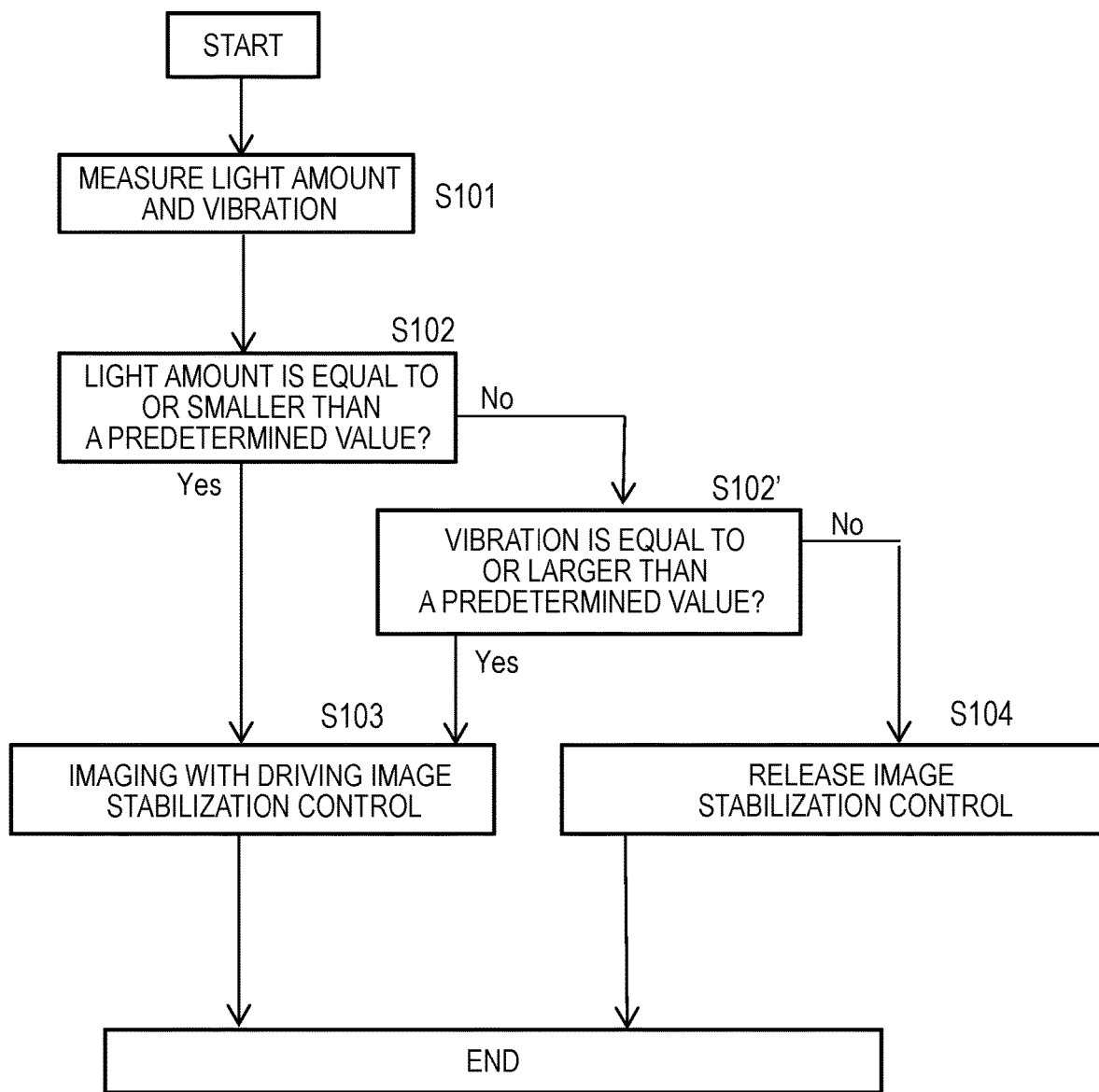
FIG. 7 is a flowchart of the first embodiment.

This embodiment, a flowchart of which is illustrated in FIG. 7, includes the sensor 10 as the detecting unit that generates (outputs) the detection signal related to the light amount around the main body of the apparatus and the vibration of the main body of the apparatus. When the light amount around the main body of the apparatus is larger than a predetermined value and the vibration is equal to or larger than a predetermined value, or when the light amount around the main body of the apparatus is equal to or smaller than the predetermined value, the determining unit 11 determines to set the driving unit 12 into the driving state. The output signal is then outputted for maintaining the driving unit 12 in the driving state or switching the driving unit 12 from the non-driving state to the driving state.

S101 and S102 are for measuring the light amount and vibration and for determining whether to perform image stabilization control (S103). Regarding the light amount, the image stabilization control is performed when the measured value of the light amount is small such as at evening or nighttime. This is because a shutter speed has to be lower to secure the light amount, and this causes blurring easily even with a small vibration.

Regarding the vibration, the image stabilization control is started when a vibration value (vibration amount) reaches a predetermined value (prescribed value) to suppress blurring during large vibration. An angle sensor, an acceleration sensor, and the like are preferred to be used as a vibration detecting unit.

When the vibration value does not reach the prescribed value, it is determined that there is no factor of blurring and thus determined to stop the image stabilization control or not to drive the driving unit 12 (S104). That is, the output signal is outputted for maintaining the driving unit 12 in the non-driving state or switching the driving unit 12 from the driving state to the non-driving state.

In addition, the image stabilization control is performed in response to the vibration value based on the detected vibration. Specifically, imaging is performed such that, when there is a large light amount such as at daytime, the image stabilization control is performed only when vibration equal to or larger than the prescribed value (predetermined value) occurs, and when there is a small light amount such as at nighttime, the image stabilization control is performed regardless of the vibration value.

It is preferable for the measurement of the light amount and vibration to repeat the measurement and determine switching and releasing of the image stabilization control every predetermined cycle (regularly).

The following procedure may be employed as a modification of the procedure of FIG. 7. First, the image stabilization control is started when the vibration value reaches the predetermined value (prescribed value) to suppress blurring during large vibration. That is, the output signal is outputted for maintaining the driving unit 12 in the driving state or switching the driving unit 12 from the non-driving state to the driving state. When the vibration value does not reach the prescribed value, it is determined that there is no factor of blurring and thus determined to stop the image stabilization control or not to drive the driving unit 12 (S104). That is, the output signal is outputted for maintaining the driving unit 12 in the non-driving state or switching the driving unit 12 from the driving state to the non-driving state.

Second Embodiment and Modification

Figure 8:
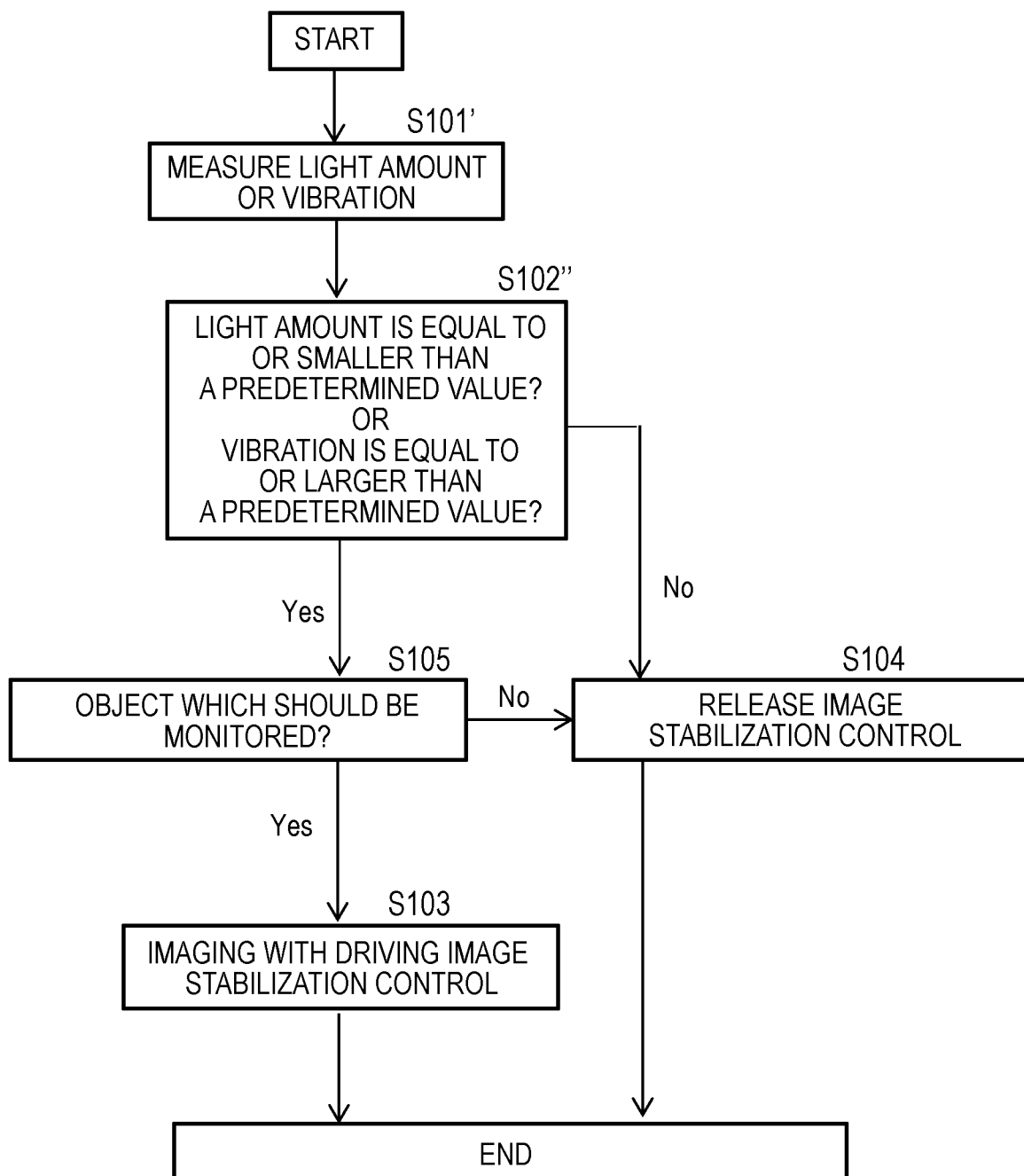
FIG. 8 is a flowchart of the second embodiment.

This embodiment, a flowchart of which is illustrated in FIG. 8, includes the sensor 10 as the detecting unit that generates the detection signal related to the light amount around the main body of the apparatus or the vibration of the main body of the apparatus, and whether the image of the object is an image of a predetermined object. When the light amount around the main body of the apparatus is equal to or smaller than a predetermined value or the vibration is equal to or larger than a predetermined value, and the image of the object is the image of the predetermined object, the determining unit 11 (FIG. 1) determines to set the driving unit 12 into the driving state. The determining unit 11 then outputs the output signal for maintaining the driving unit 12 in the driving state or switching the driving unit 12 from the non-driving state to the driving state.

On the other hand, when determining to set the driving unit 12 into the non-driving state, the determining unit 11 outputs the output signal for maintaining the driving unit 12 in the non-driving state or switching the driving unit 12 from the driving state to the non-driving state.

In S105, determination whether to perform the image stabilization control is made by determining whether the object is the monitoring target that should be imaged (predetermined object). If the object is not the imaging target (or the user determines there is no need to image this object), the image stabilization control is not performed on the object, and the output signal is outputted for maintaining the driving unit 12 in the non-driving state or switching the driving unit 12 from the driving state to the non-driving state. This extends the durability of the monitoring device.

In this case, regarding the monitoring target, determination whether the object is the monitoring target is made by storing in advance the information regarding the target, which is obtained by facial recognition or reading of a number plate, into the memory 9 (FIG. 1) of the main body of the apparatus for recognition. That is, this embodiment includes the memory 9 as the storing unit that can store the information for recognizing the monitoring target, and the sensor 10 detects whether the image of the imaged object includes that information for recognizing the monitoring target (predetermined object) stored in the memory 9.

The determination in S105 whether to perform the image stabilization control may be made before S101, and changing of the order of the control is not limited.

Third Embodiment and Modification

Figure 9:
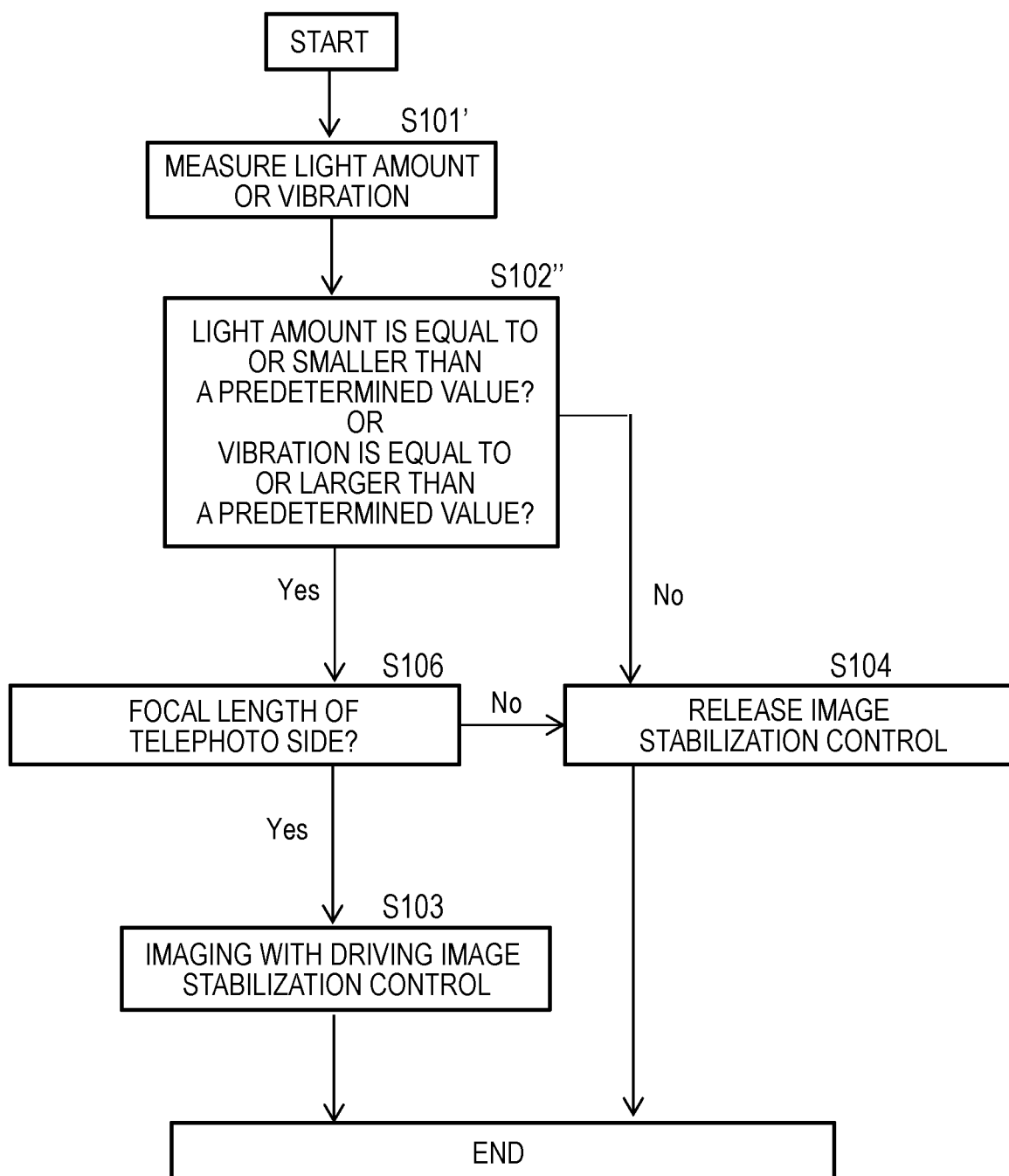
FIG. 9 is a flowchart of the third embodiment.

This embodiment, a flowchart of which is illustrated in FIG. 9, includes the sensor 10 as the detecting unit that generates the detection signal related to the light amount around the main body of the apparatus or the vibration of the main body of the apparatus, and the focal length of the imaging optical system. When the light amount around the main body of the apparatus is equal to or smaller than a predetermined value or the vibration is equal to or larger than a predetermined value, and the focal length of the imaging optical system is equal to or larger than a predetermined value (telephoto side), the determining unit 11 determines to set the driving unit 12 into the driving state. The output signal is then outputted for maintaining the driving unit 12 in the driving state or switching the driving unit 12 from the non-driving state to the driving state.

S106 is for determining whether to perform the image stabilization control by determining the focal length of the imaging lens. Since an angle of view is narrower in the telephoto side, there is more need of concerning the blurring. With this in mind, the image stabilization control is executed only when the imaging is performed on the telephoto side of a previously set focal length (i.e., long focal length that is focal length equal to or larger than predetermined value). Thus, even when a result of the determination in S102" is previously obtained as Yes, since image stabilization imaging is performed in response to the focal length during the imaging, no image stabilization control may be performed.

The determination in S106 whether to perform the image stabilization control may be made before S101, and changing of the order of the control is not limited.

Fourth Embodiment

Figure 10:
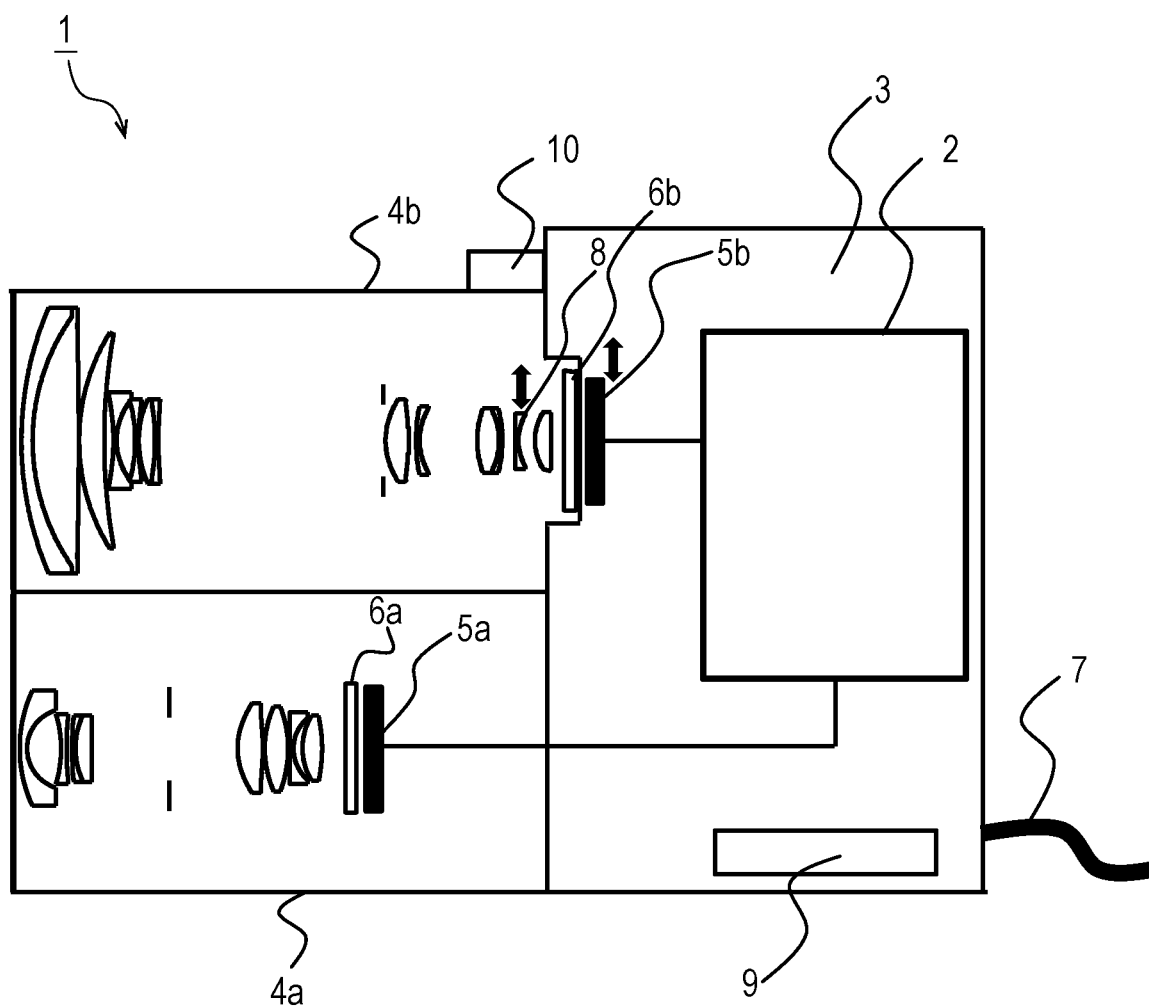
FIG. 10 is a schematic diagram of a main part of an image pickup apparatus of a fourth embodiment.
Figure 11:
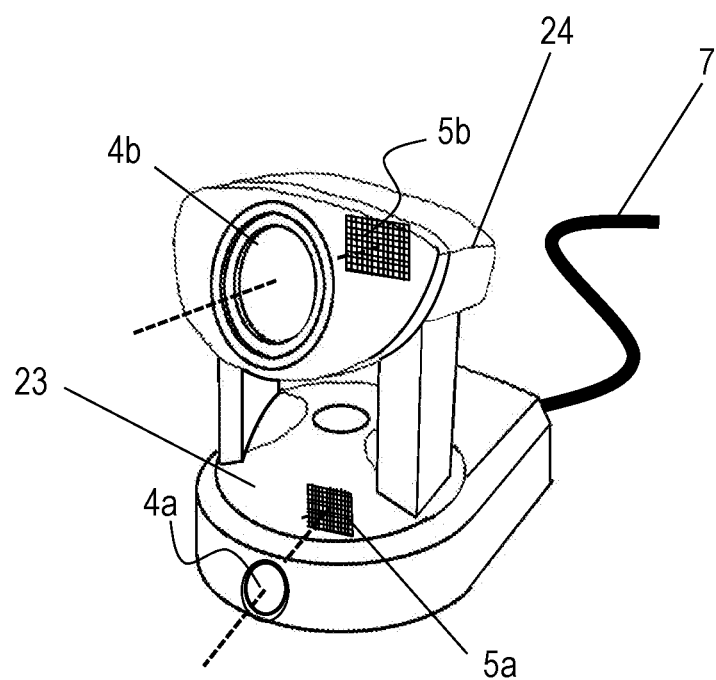
FIG. 11 is an appearance view of the image pickup apparatus of the fourth embodiment.

Hereinafter, a fourth embodiment of the present invention is described with reference to FIGS. 10 to 17. The image pickup apparatus of this embodiment can be the monitoring camera like the one illustrated in the appearance view of FIG. 11. This embodiment includes two lens barrels, which are a lens barrel A (provided with a first imaging optical system 4a) and a lens barrel B (provided with a second imaging optical system 4b), as illustrated in FIGS. 10 and 11.

The first imaging optical system 4a is an imaging optical system for imaging a wide area. When the predetermined object (monitoring target) that should be magnified and imaged is detected through the imaging using the lens barrel A, the second imaging optical system 4b correspondingly focuses and zooms in on the predetermined object, and also the image stabilization control is executed. The reference numerals 23 and 24 denote housings that can respectively drive pan tilt mechanisms corresponding to the lens barrels A and B, and the mechanisms are driven together with the lens barrels in arbitrary directions such as a pan (right-left) direction and a tilt (up-down) direction. This makes it possible to follow the target object. It is preferred to allow the lens barrels A and B to independently determine the direction of imaging like this.

Figure 17:
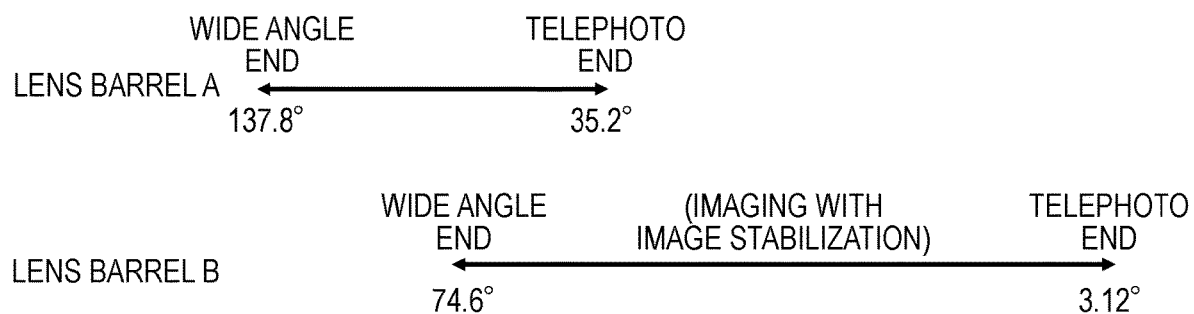
FIG. 17 is a diagram illustrating respective imaging angle of views of lens barrels A and B of the fourth embodiment.

As illustrated in FIG. 17, focal length areas for imaging by the two lens barrels A and B are different from each other (FIG. 17 illustrates diagonal angle of views that can be imaged by the lens barrels A and B (entire angle of view 2ω)). Compared with the lens barrel A, the lens barrel B has a focal length range that enables imaging at a further telephoto side, and the angle of view at the furthest telephoto side is a half angle of view ω of about 1.6°.

The reason why the focal length areas for imaging by the two lens barrels A and B are different from each other is to easily secure an imaging area that is hardly obtained by one zoom lens (imaging is performed from a further wide angle side to a further telephoto side).

That is, although imaging can be performed from a further wide angle side to a further telephoto side by setting a higher zoom ratio with one zoom lens, size of the lens must be large, and this is a big problem for the size of a product. In addition, as the zoom ratio is increased, a zoom speed becomes a problem since the zooming into a desired angle of view takes time. Moreover, there is also a demand of continuing the imaging of wide area (wide angle) even during the imaging of the telephoto side for monitoring the desired object. This embodiment is considered to solve these problems.

In this embodiment, it is possible to secure wider imaging region by combining two regions of angle of view. Both the imaging optical systems of the lens barrels A and B can change the focal lengths, and the imaging optical system of the lens barrel B includes the focal length closer to the telephoto side than the imaging optical system of the lens barrel A while the imaging optical system of the lens barrel A includes the focal length closer to the wide angle side than the imaging optical system of the lens barrel B (FIG. 17).

Not only a lens barrel intended for imaging using visible light but also a lens barrel that can perform imaging using near-infrared light and far-infrared light may be selected as the lens barrel A. Use of the far-infrared light has the advantage that it is excellent for finding a farther object even with a lens barrel for wide angle imaging.

During the telephoto imaging, blurring of the image of the object is more likely to occur. Thus, proposal of a method of obtaining high optical performance is also desired in this case. The monitoring camera is preferable to be mounted with the image stabilization mechanism, since the camera is likely to be affected by winds and rains outdoor and vibration of a vehicle. However, when the image stabilization control of the image stabilization mechanism is performed in the monitoring camera, the durability is a big problem in terms of continuous driving for monitoring.

With this background, if it is possible to use an interchangeable lens provided with the image stabilization mechanism that is adapted to the monitoring camera, the interchangeable lens can be more widely applied not only to digital cameras and video cameras but also monitoring cameras. This embodiment provides an image pickup apparatus that can concurrently achieve the two objects, which are enlargement of the monitoring imaging area as described above and imaging for monitoring accompanied with the image stabilization control.

As the image pickup element, this embodiment includes a first image pickup element 5a and a second image pickup element 5b, and as the imaging optical system, this embodiment includes the first imaging optical system 4a provided in the lens barrel A and the second imaging optical system 4b provided in the lens barrel B respectively corresponding to the first and second image pickup elements 5a and 5b. The correcting unit that corrects blurring of the image of the object allows the driving unit 12 to drive at least one of the second imaging optical system 4b and the second image pickup element 5b to correct the blurring of the image.

Likewise the second embodiment, the sensor 10 (FIG. 10) detects whether the image of the object imaged by the first imaging optical system 4a is the image of the predetermined object (monitoring target). That is, this embodiment includes the memory 9 (FIG. 1) as the storing unit that can store the information for recognizing the monitoring target, and the sensor 10 (FIG. 10) detects whether the image of the imaged object includes that information for recognizing the monitoring target (predetermined object) stored in the memory 9. When the image of the object is the image of the predetermined object, the determining unit 11 (FIG. 1) determines to set the driving unit 12 into the driving state likewise the second embodiment.

Here, the first image pickup element 5a may be also used as the sensor 10.

Next, the image pickup apparatus of this embodiment is described in more detail. First, a lens related to the imaging optical system mounted in the image pickup apparatus is described. The first imaging optical system 4a (lens barrel A) has a specification that gives priority to particularly the imaging of the wide angle area. The first imaging optical system 4a is used for continuous imaging because the focal length thereof is short and thus there is no need to be provided with the image stabilization mechanism.

On the other hand, compared with the first imaging optical system 4a, the second imaging optical system 4b has a specification that enables the imaging of a further telephoto area and is provided with the image stabilization mechanism. The image stabilization mechanism is provided in a lens unit included in the second imaging optical system 4b (image stabilization lens unit) or provided in the sensor itself. When the image stabilization imaging is performed, either one or both of the image stabilization lens unit and the sensor are driven in the direction orthogonal to an optical axis of the second imaging optical system 4b.

As an example of use, the lens barrel A is used for continuous imaging, and when the predetermined object (monitoring target) should be magnified for imaging, the lens barrel B is operated for imaging with performing the image stabilization control. Here, in terms of the durability of the image pickup apparatus for monitoring, the image stabilization mechanism is driven only when the existence of the monitoring target is recognized.

This embodiment includes the driving unit 12 that moves at least one of the imaging optical system 4b of the lens barrel B and the image pickup element 5b corresponding to the imaging optical system 4b in the direction orthogonal to the optical axis direction, and the determining unit 11, on the precondition that the sensor 10 detects whether the image of the object is the monitoring target. However, it is not limited thereto. This embodiment may include the driving unit 12 that moves at least one of the imaging optical system 4b and the image pickup element 5b in the direction orthogonal to the optical axis direction, and the determining unit 11, on the precondition that the arbitrary sensor 10 described in the first to third embodiments and modifications is included.

Figure 12:
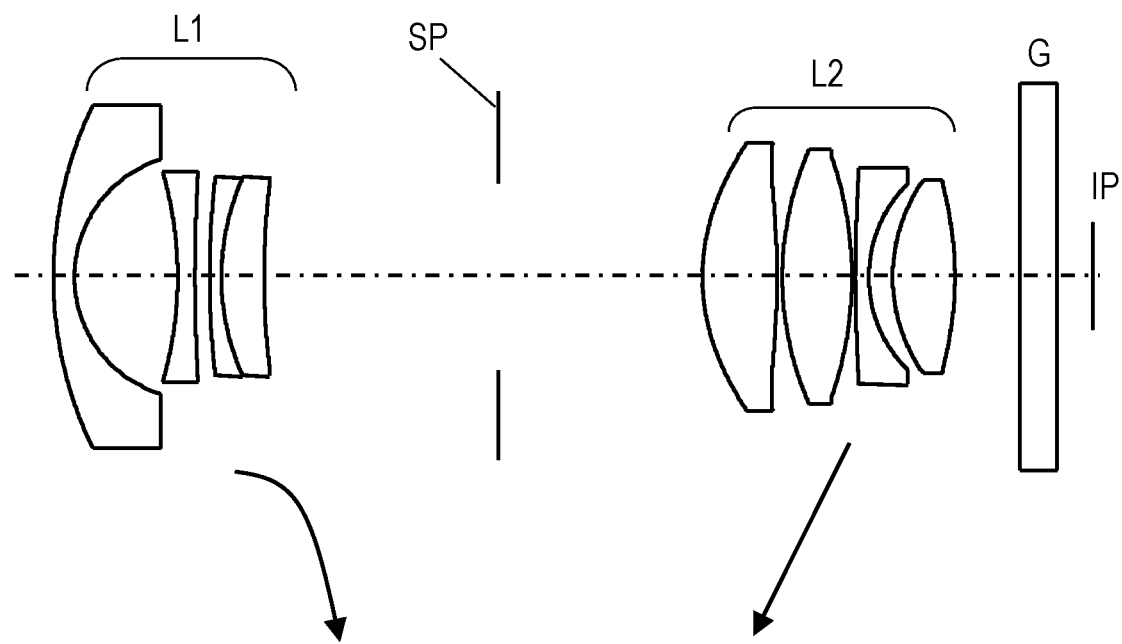
FIG. 12 is a cross-sectional view of a lens barrel A of the fourth embodiment at the wide angle end.

In this case, the imaging optical system illustrated in FIG. 12 is used as the first imaging optical system 4a. FIG. 12 illustrates a cross sectional view and a diagram of moving loci of lenses of the lens barrel A of this embodiment at the wide angle end. This imaging optical system is a zoom lens including two units that are, in the order from the object side, a first lens unit L1 with a negative refractive power and a second lens unit L2 with a positive refractive power. During varying magnification, the two lens units respectively move in directions of arrows.

Figure 13:
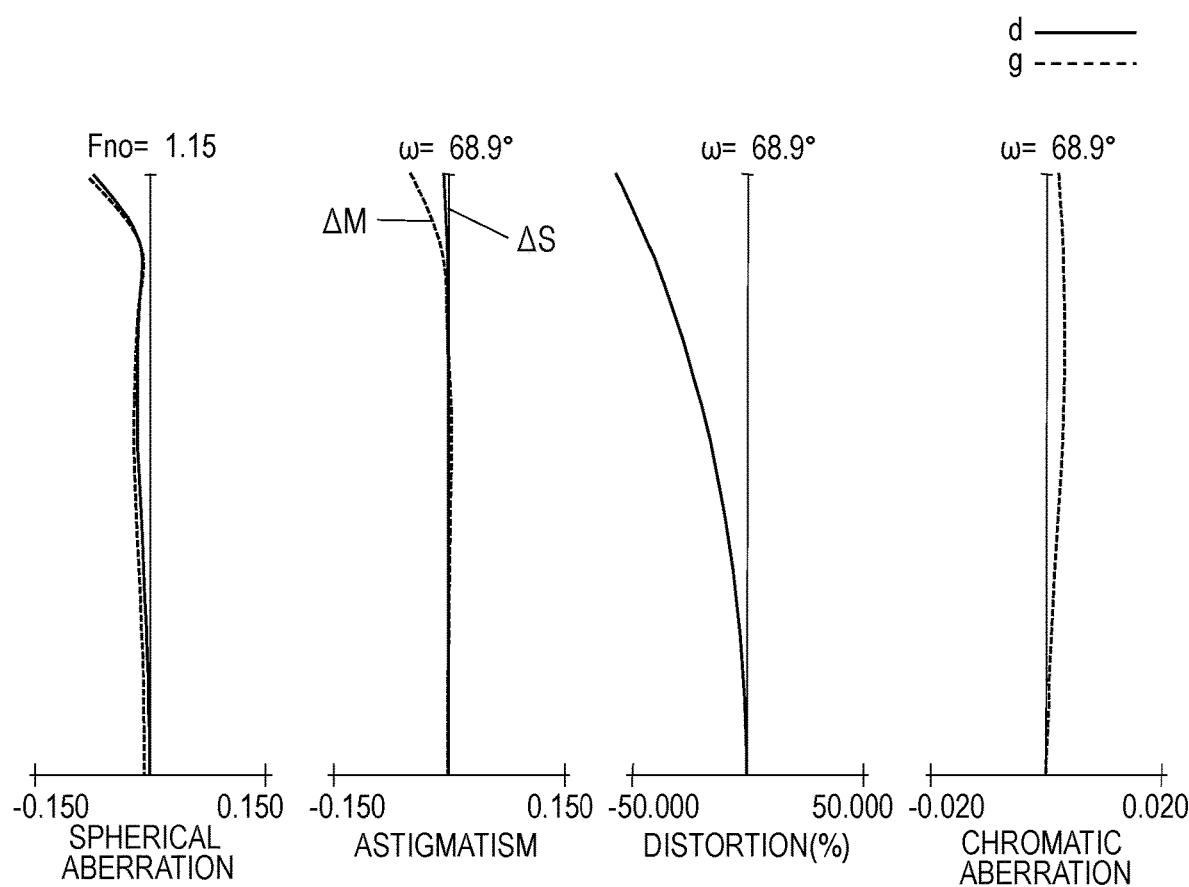
FIG. 13 is aberration diagrams of the lens barrel A of the fourth embodiment at the wide angle end.
Figure 14A:
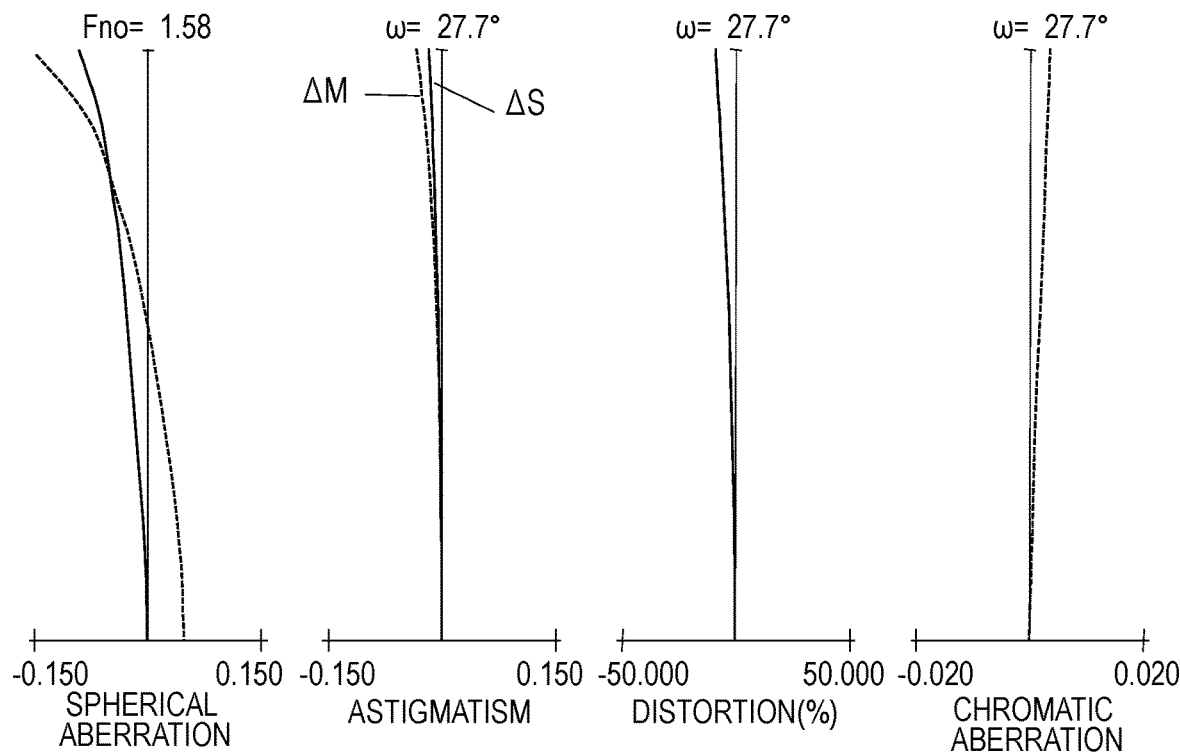
FIG. 14A is aberration diagrams of the lens barrel A of the fourth embodiment at the intermediate zoom position.
Figure 14B:
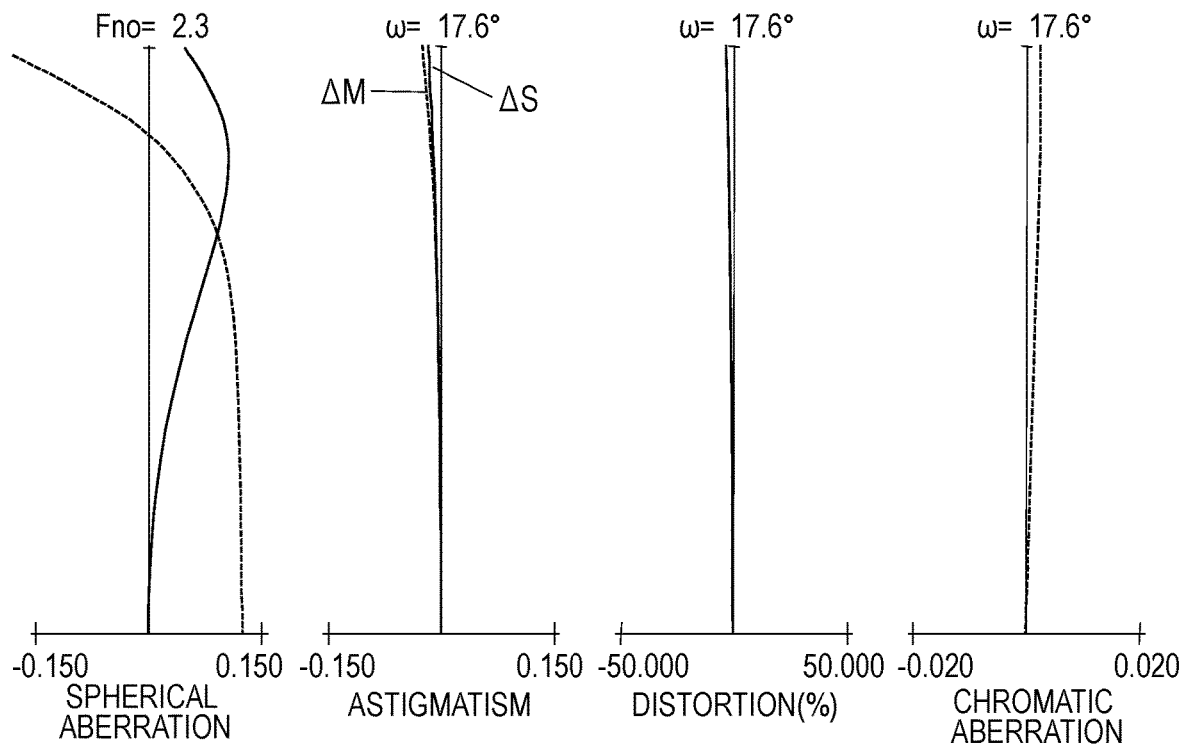
FIG. 14B is aberration diagrams of the lens barrel A of the fourth embodiment at the telephoto end.

FIG. 13 illustrates aberration diagrams of the lens barrel A of this embodiment at the wide angle end, FIG. 14A illustrates aberration diagrams of the lens barrel A of this embodiment at the intermediate zoom position, and FIG. 14B illustrates aberration diagrams of the lens barrel A of this embodiment at the telephoto end.

Figure 15:
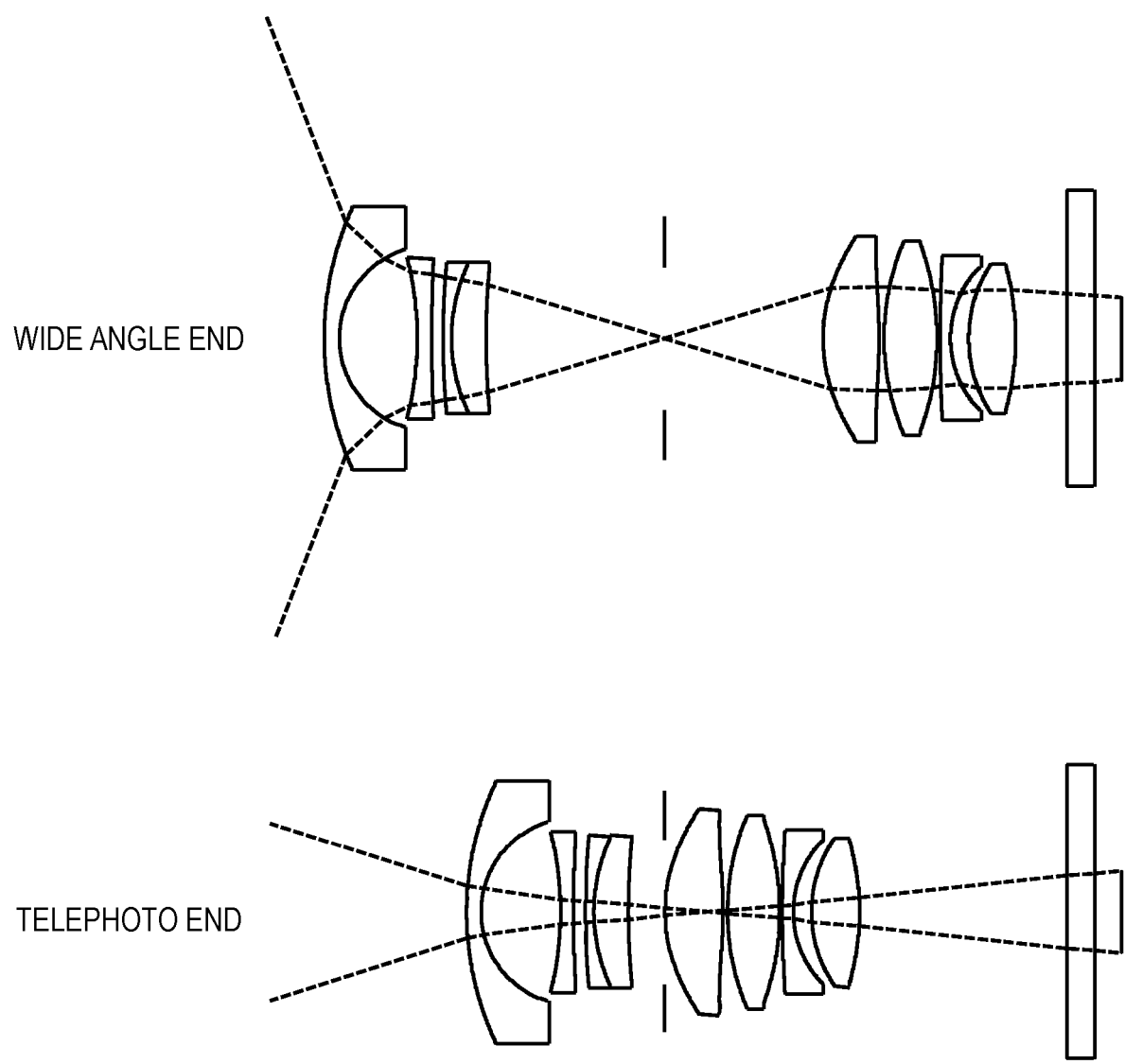
FIG. 15 is optical path diagrams of principal rays of the lens barrel A of the fourth embodiment at the wide angle end and the telephoto end.

FIG. 15 illustrates regions of the imaging angle of views of the lens barrel A, and dotted lines indicate optical paths of principal rays that form the maximum image height while an optical path region on the object side corresponds to the imaging region. In this embodiment, the half angle of view w is a wide angle of view of about 69°, and this enables monitoring of a wide region. The first imaging optical system 4a is preferred to be a zoom lens for adjusting the object region that is continuously imaged. In this embodiment, imaging with the half angle of view of about 69° to about 18° is possible.

The lens barrels A and B may be interchangeable like the interchangeable lens and can be attached to and detached from the image pickup apparatus. There are some merits; this enables using of a lens for a single reflex camera and selecting of a lens appropriate for monitoring.

It is preferable for the lens barrels A and B to satisfy the following conditions;

$$8.0<(FBt/YB)/(FAw/YA)<100 \quad (2),$$

where a focal length of the first imaging optical system 4a of the lens barrel A at the wide angle end is represented by FAw, the maximum image height used during imaging by the first imaging optical system 4a of the lens barrel A is represented by YA, a focal length of the second imaging optical system 4b of the lens barrel B at the telephoto end is represented by FBt, and the maximum image height used during imaging by the second imaging optical system 4b of the lens barrel B is represented by YB.

This is a condition to perform monitoring for different purposes, from wide angle imaging to telephoto imaging. If the value falls below the lower limit value in the conditional expression (2), the focal length of the second imaging optical system 4b at the telephoto end side is insufficient (angle of view is wide) and this makes it impossible to image the desired object close up, which is not preferable. On the other hand, if the value exceeds the upper limit value in the conditional expression (2), it is not preferable. This is because the focal length of the second imaging optical system 4b is too long and the lens barrel A and the lens barrel B have such a large difference in field of view that they may generate an unadjustable range inappropriate as the field of view which the image pickup apparatus can adjust.

Figure 16:
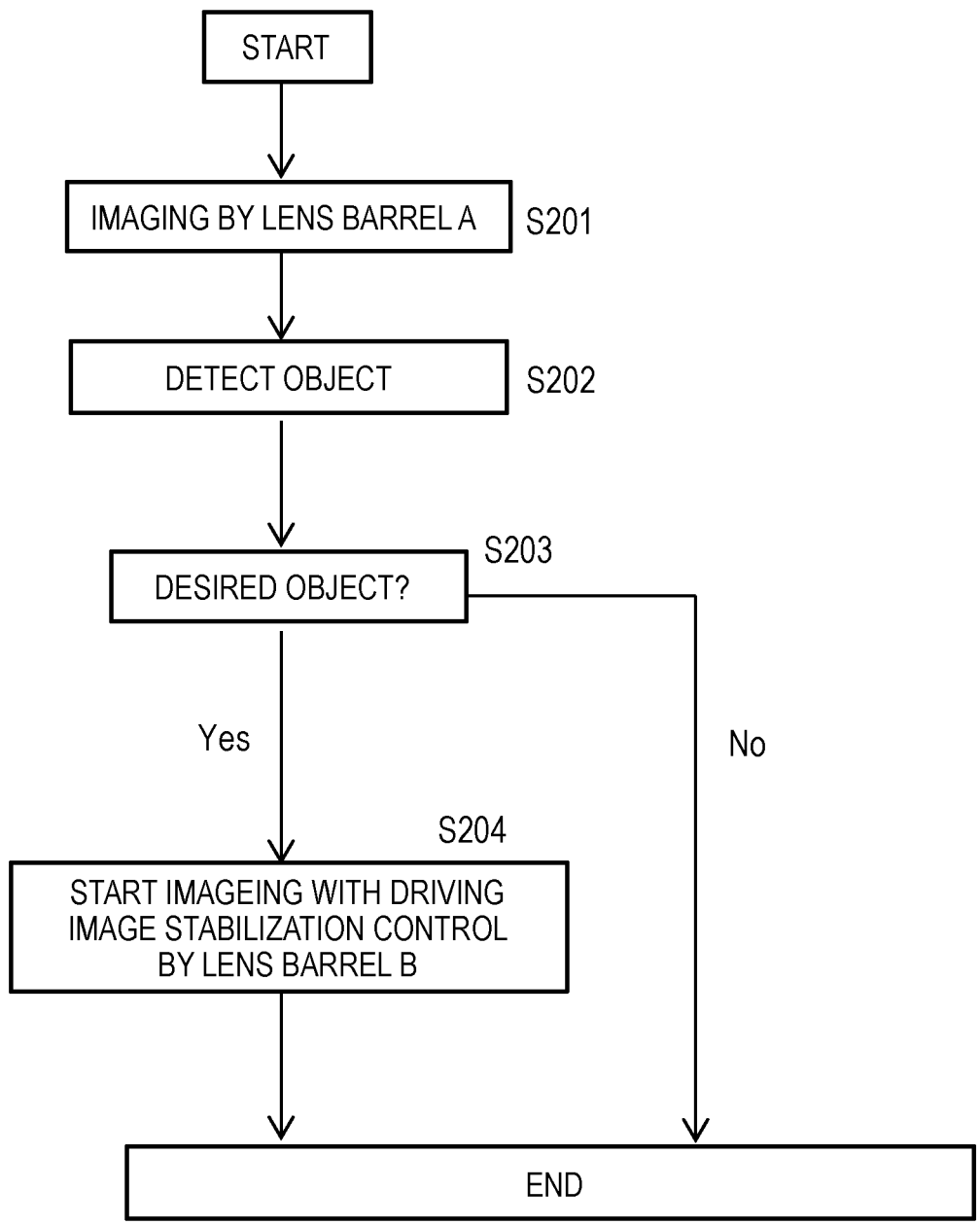
FIG. 16 is a flowchart of the fourth embodiment.

FIG. 16 is an example of a flowchart of this embodiment. S201 and S202 are for the lens barrel A performing continuous imaging. When the predetermined object (monitoring target) is recognized in S202, the imaging by the second imaging optical system 4b of the lens barrel B is started. In the imaging at this point, the image stabilization mechanism is operated. The image stabilization mechanism of the lens barrel B is operated when the predetermined object (monitoring target) is recognized. This is for concerning the durability of the image stabilization mechanism and extending the life of the monitoring camera (improving the durability of the product) by avoiding wear of the mechanism when the telephoto imaging is unnecessary.

Likewise the description of the first to third embodiments, an angle sensor, an acceleration sensor, and the like are preferred to be used as the vibration detecting unit.

Numerical Examples Corresponding to First to Fourth Embodiments

Next, numerical examples corresponding to the above embodiments are described. In the numerical examples, surface numbers are indicated in the order from the object side, and r represents a curvature radius, d represents an interval, and nd and vd respectively represent a refractive index and Abbe number based on the d-line. * represents an aspherical surface.

In the numerical examples, two surfaces closest to the image side are plane surfaces corresponding to the optical block G. The shape of the aspheric surface is represented by the following equation;

$$x=(h^2/r)/[1+\{1-(1+K)(h/r)^2\}^{1/2}]+A4\cdot h^4+A6\cdot h^6+A8\cdot h^8+A10\cdot h^{10},$$

where displacement in the optical axis direction at a position of a height h from the optical axis is represented by x based on a surface vertex. Note that r is a paraxial curvature radius. K is a conic constant, and A4, A6, A8, and A10 respectively represent four-dimensional, six-dimensional, eight-dimensional, and ten-dimensional aspherical coefficients. For example, "e-Z" represents "$10^{-Z}$."

The angle of view is a numerical value of the half angle of view (ω) related to the angle of view that can be imaged for which an amount of distortion is considered.

1) Imaging Optical System of First to Third Embodiments and Second Imaging Optical System of Fourth Embodiment (Lens Barrel B)

| Surface data | | | | |
|---|---|---|---|---|
| Surface number | r | d | nd | vd |
| 1 | 52.909 | 1.75 | 1.84666 | 23.8 |
| 2 | 33.749 | 6.91 | 1.59282 | 68.6 |
| 3 | −1003.25 | 0.15 | | |
| 4 | 31.488 | 3.63 | 1.59282 | 68.6 |
| 5 | 81.11 | (variable) | | |
| 6 | −50.947 | 0.7 | 1.91082 | 35.3 |
| 7 | 9.685 | 2.73 | | |
| 8 | −25.735 | 0.5 | 1.88300 | 40.8 |
| 9 | 34.543 | 0.15 | | |
| 10 | 17.169 | 2.32 | 1.95906 | 17.5 |
| 11 | −45.26 | 0.5 | 1.88300 | 40.8 |
| 12 | 45.024 | (variable) | | |
| 13(stop) | ∞ | 0.15 | | |
| 14* | 9.953 | 3.5 | 1.69350 | 53.2 |
| 15* | −53.889 | 1.11 | | |
| 16 | 26.596 | 0.6 | 1.91082 | 35.3 |
| 17 | 9.295 | (variable) | | |
| 18* | 13.382 | 3.27 | 1.69350 | 53.2 |
| 19 | −12.143 | 0.5 | 1.95906 | 17.5 |
| 20 | −21.526 | (variable) | | |
| 21* | −65 | 0.45 | 1.60300 | 28.4 |
| 22* | 8.145 | 2.63 | | |
| 23 | 8.149 | 2.34 | 1.83400 | 37.2 |
| 24 | 152.735 | 2 | | |
| 25 | ∞ | 1.85 | 1.51633 | 64.2 |
| image plane | ∞ | | | |

| Aspherical surface data |
|---|
| 14th surface |
| K = −7.54120e−001 |
| A4 = −9.19942e−006 |
| A6 = 4.70013e−007 |
| A8 = 6.25046e−009 |
| A10 = −7.05446e−010 |

-continued

Surface data

15th surface

K = 0.00000e+000
A4 = 4.11310e−005
A6 = 1.28934e−006
A8 = −5.05647e−008
A10 = 1.21906e−011

18th surface

K = 0.00000e+000
A4 = −8.16631e−005
A6 = 9.14599e−007
A8 = −6.15743e−008
A10 = 9.22454e−010

21th surface

K = 0.00000e+000
A4 = 9.95119e−005
A6 = −2.81784e−006
A8 = −1.15204e−009

22th surface

K = 0.00000e+000
A4 = 7.16500e−005
A6 = −3.01556e−006
A8 = 1.13555e−008
A10 = −1.59329e−009

Various data
Zoom ratio 24.1

|  | Wide angle | Intermediate | Telephoto |
|---|---|---|---|
| Focal length | 3.44 | 24.68 | 82.94 |
| F-number | 1.44 | 1.82 | 2.45 |
| Angle of view (deg) | 37.3 | 5.38 | 1.56 |
| Image height | 2.08 | 2.25 | 2.25 |
| Total lens length | 90.21 | 90.21 | 90.21 |
| BF (in Air) | 12.30 | 12.30 | 12.30 |
| d5 | 1.38 | 25.83 | 33.98 |
| d12 | 34.25 | 9.8 | 1.65 |
| d17 | 8.72 | 3.75 | 9.07 |
| d20 | 2.01 | 6.98 | 1.66 |

Focal length of each lens unit

| | |
|---|---|
| first lens unit | 48.78 |
| second lens unit | −7.00 |
| third lens unit | 28.47 |
| fourth lens unit | 13.91 |
| front unit 5a | −11.98 |
| rear unit 5b | 10.25 |

Following Table 1 is a table that indicates relationships between the above-described conditional expressions and the above-described numerical examples.

TABLE 1

| | Numerical example described above |
|---|---|
| Conditional expression (1) | 1.13 |
| Conditional expression (A) | −1.16 |
| Conditional expression (B) | −0.86 |

2) First Imaging Optical System of Fourth Embodiment (Lens Barrel A)

Surface data

| Surface number | r | d | nd | vd |
|---|---|---|---|---|
| 1 | 16.727 | 0.85 | 2.00100 | 29.10 |
| 2 | 5.054 | 4.26 | | |
| 3 | −16.519 | 0.75 | 1.88300 | 40.80 |
| 4 | 85.000 | 0.60 | | |
| 5 | 37.371 | 0.50 | 1.59282 | 68.60 |
| 6 | 9.792 | 1.80 | 1.95906 | 17.50 |
| 7 | 36.358 | (variable) | | |
| 8(stop) | ∞ | (variable) | | |
| 9* | 8.418 | 3.09 | 1.69350 | 53.20 |
| 10* | −28.457 | 0.23 | | |
| 11 | 13.513 | 2.87 | 1.49700 | 81.50 |
| 12 | −14.978 | 0.15 | | |
| 13 | 78.995 | 0.55 | 1.84666 | 23.80 |
| 14 | 5.414 | 1.00 | | |
| 15 | 7.102 | 2.60 | 1.49700 | 81.50 |
| 16* | −14.627 | (variable) | | |
| 17 | ∞ | 1.50 | 1.51633 | 64.10 |
| image plane | ∞ | | | |

Aspherical surface data

9th surface

K = −1.71748e+000
A4 = 1.25824e−004
A6 = 2.93712e−006
A8 = −6.12073e−008
A10 = −1.23446e−009
A12 = 4.79041e−027

10th surface

K = 0.00000e+000
A4 = 4.03384e−004
A6 = 3.76351e−006
A8 = −1.34212e−007

16th surface

K = 0.00000e+000
A4 = 1.15597e−004
A6 = 1.92297e−006

Various data
Zoom ratio 3.62

|  | Wide angle | Intermediate | Telephoto |
|---|---|---|---|
| Focal length | 2.03 | 4.69 | 7.34 |
| F-number | 1.15 | 1.58 | 2.3 |
| Angle of view (deg) | 68.9 | 27.7 | 17.6 |
| Image height | 2.25 | 2.25 | 2.25 |
| Total lens length | 42.65 | 34.21 | 34.95 |
| BF (in Air) | 5.21 | 9.46 | 13.71 |
| d7 | 9.7 | 1.25 | 1.99 |
| d8 | 8.5 | 4.25 | 0 |
| d16 | 2.73 | 6.98 | 11.23 |

Focal length of each lens unit

| | |
|---|---|
| first lens unit | −5.33 |
| second lens unit | 8.53 |

Following Table 2 is a table that indicates relationships between the above-described conditional expressions related to the fourth embodiment and the above-described numerical example related to the fourth embodiment.

TABLE 2

|  |  | Numerical example related to fourth embodiment |
|---|---|---|
|  | FBt | 82.94 |
|  | YB | 2.25 |
|  | FAw | 2.03 |
|  | YA | 2.25 |
| Conditional expression (1) | (FBt/YB)/(FAw/YA) | 40.9 |
| Conditional expression (A) | DA | 1.13 |

(Modifications)

Preferable embodiments of the present invention are described above; however, the present invention is not limited to these embodiments and various modifications and changes are possible within the scope of the gist. For example, the image pickup apparatus according to the above-described embodiments may be disposed in a vehicle and used as a vehicle-mounted camera.

(Modification 1)

In the above-described first to fourth embodiments, the distortion and chromatic aberration can be corrected by an electric correcting unit. Also, a lens type (lens unit configuration) and the shape and number of the glass of the imaging optical system are not limited to those illustrated in the embodiments and can be changed appropriately.

The two lens barrels A and B are used in the fourth embodiment; however, the number of the lens barrels is not limited to two and more number of lens barrels can be used for the image pickup apparatus.

(Modification 2)

In the first embodiment, the sensor 10 detects the light amount around the main body of the apparatus and the vibration of the main body of the apparatus; however, the sensor 10 may detect time of day of imaging instead of the light amount around the main body of the apparatus. In this case, when the time of day of imaging is daytime and the vibration is equal to or larger than a predetermined value, or when the time of day of imaging is nighttime, the determining unit determines to set the driving unit 12 into the driving state.

(Modification 3)

In the first embodiment, the sensor 10 is provided with at least the function of detecting the light amount around the main body of the apparatus; however, the device 10 may be provided with a function of detecting the light amount of the object. In this case, when the light amount of the object is equal to or smaller than a predetermined value, the determining unit 11 (FIG. 1) determines to set the driving unit 12 into the driving state.

(Modification 4)

In the fourth embodiment, the first image pickup element 5a and the second image pickup element 5b are individually provided as image pickup elements; however, a common image pickup element may be used instead of the first and second image pickup elements. In this case, an optical path switching unit for switching the optical path is provided to allow light fluxes through the optical paths of the first and second imaging optical system to enter the common image pickup element.

That is, for example, the image pickup element 5b is provided as the common image pickup element without providing the image pickup element 5a, and an optical path of the second imaging optical system is formed that reaches the common image pickup element when a quick return mirror as the optical path switching unit is retracted. Meanwhile, a fixed mirror for bending the optical path is provided in front of the quick return mirror to form an optical path of the first imaging optical system that reaches the common image pickup element by being reflected by the quick return mirror when the quick return mirror is inserted in the optical path of the second imaging optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-195995, filed Oct. 6, 2017, which is hereby incorporated by reference herein in its entirety.

What is claimed is:

1. An image pickup apparatus comprising:
   an optical system that forms an image of an object;
   an image pickup element that receives light of the image formed by the optical system;
   a driving unit that drives at least one of an optical element included in the optical system and the image pickup element in a direction including a component of a direction perpendicular to an optical axis of the optical system;
   a detecting unit that outputs a detection signal including information regarding a light amount of the object; and
   a processor that performs first determination that the driving unit is set to be in a non-driving state or performs second determination that the driving unit is set to be in a driving state repeatedly during continuous imaging based on the detection signal, wherein
   when the first determination is performed, the processor outputs a signal for maintaining the driving unit in the non-driving state or switching the driving unit from the driving state to the non-driving state,
   when the second determination is performed, the processor outputs a signal for maintaining the driving unit in the driving state or switching the driving unit from the non-driving state to the driving state, and
   when the light amount of the object is equal to or smaller than a predetermined value, the processor performs the second determination.

2. The image pickup apparatus according to claim 1, wherein
   the detection signal includes information regarding a vibration value of the image pickup apparatus, and
   when the light amount is larger than a predetermined value and the vibration value is equal to or larger than a predetermined value, or when the light amount is equal to or smaller than the predetermined value, the processor performs the second determination.

3. The image pickup apparatus according to claim 1, wherein
   the detection signal includes, instead of the information regarding the light amount of the object, information regarding a light amount around the image pickup apparatus or information regarding a vibration value of the image pickup apparatus and information regarding whether the object is a predetermined object, and
   when the light amount is equal to or smaller than a predetermined value or the vibration value is equal to or larger than a predetermined value and the object is the predetermined object, the processor performs the second determination.

4. The image pickup apparatus according to claim 1, wherein the detection signal includes, instead of the information regarding the light amount of the object, information regarding a light amount around the image pickup apparatus or information regarding a vibration value of the image pickup apparatus and information regarding a focal length of the optical system, and when the light amount is equal to or smaller than a predetermined value or the vibration value is equal to or larger than a predetermined value and the focal length of the optical system is equal to or larger than a predetermined value, the processor performs the second determination.

5. The image pickup apparatus according to claim 1, wherein the detection signal includes information regarding a vibration value of the image pickup apparatus, and when the vibration value is equal to or larger than a predetermined value, the processor performs the second determination.

6. The image pickup apparatus according to claim 1, wherein the detection signal includes information regarding a focal length of the optical system, and when the focal length of the optical system is equal to or larger than a predetermined value, the processor performs the second determination.

7. The image pickup apparatus according to claim 1, wherein the optical system includes an aperture stop and a lens unit that is arranged on an image side of the aperture stop, and the driving unit drives the lens unit in the direction including the component of the direction perpendicular to the optical axis.

8. The image pickup apparatus according to claim 7, wherein the lens unit does not move for zooming, and a following conditional expression is satisfied:

$$1.0 < DA < 3.0,$$

where DA represents a specific gravity of material of at least one lens included in the lens unit.

9. An image pickup apparatus comprising:

an optical system that forms an image of an object;

an image pickup element that receives light of the image formed by the optical system;

a driving unit that drives at least one of an optical element included in the optical system and the image pickup element in a direction including a component of a direction perpendicular to an optical axis of the optical system;

a detecting unit that outputs a detection signal including information regarding time of day of imaging and a vibration value of the image pickup apparatus; and a processor that performs first determination that the driving unit is set to be in a non-driving state or performs second determination that the driving unit is set to be in a driving state based on, as information regarding the object, the detection signal, wherein when the first determination is performed, the processor outputs a signal for maintaining the driving unit in the non-driving state or switching the driving unit from the driving state to the non-driving state, when the second determination is performed, the processor outputs a signal for maintaining the driving unit in the driving state or switching the driving unit from the non-driving state to the driving state, and when the time of day of imaging is daytime and the vibration value is equal to or larger than a predetermined value, or when the time of day of imaging is nighttime, the processor performs the second determination.

10. An image pickup apparatus comprising:

an optical system that forms an image of an object;

an image pickup element that receives light of the image formed by the optical system;

a driving unit that drives at least one of an optical element included in the optical system and the image pickup element in a direction including a component of a direction perpendicular to an optical axis of the optical system;

a detecting unit that outputs a detection signal including information regarding whether the object is a predetermined object; and a processor that performs first determination that the driving unit is set to be in a non-driving state or performs second determination that the driving unit is set to be in a driving state based on, as information regarding the object, the detection signal, wherein when the first determination is performed, the processor outputs a signal for maintaining the driving unit in the non-driving state or switching the driving unit from the driving state to the non-driving state, when the second determination is performed, the processor outputs a signal for maintaining the driving unit in the driving state or switching the driving unit from the non-driving state to the driving state, and when the object is the predetermined object, the processor performs the second determination.

11. The image pickup apparatus according to claim 10, wherein the detecting unit includes the image pickup element.

12. The image pickup apparatus according to claim 10, further comprising a storing unit that stores recognition information for recognizing whether the object is a predetermined object, wherein the processor performs the first or second determination based on information regarding the object outputted from the image pickup element and the recognition information.

* * * * *